Nov. 22, 1949    C. W. HANSEN    2,488,626
SILO FILLER AND GRAIN BLOWER

Filed July 2, 1947    2 Sheets-Sheet 1

Inventor:
Charles W. Hansen
By Soans, Pond, & Anderson
Att'ys.

Nov. 22, 1949 — C. W. HANSEN — 2,488,626
SILO FILLER AND GRAIN BLOWER
Filed July 2, 1947 — 2 Sheets-Sheet 2
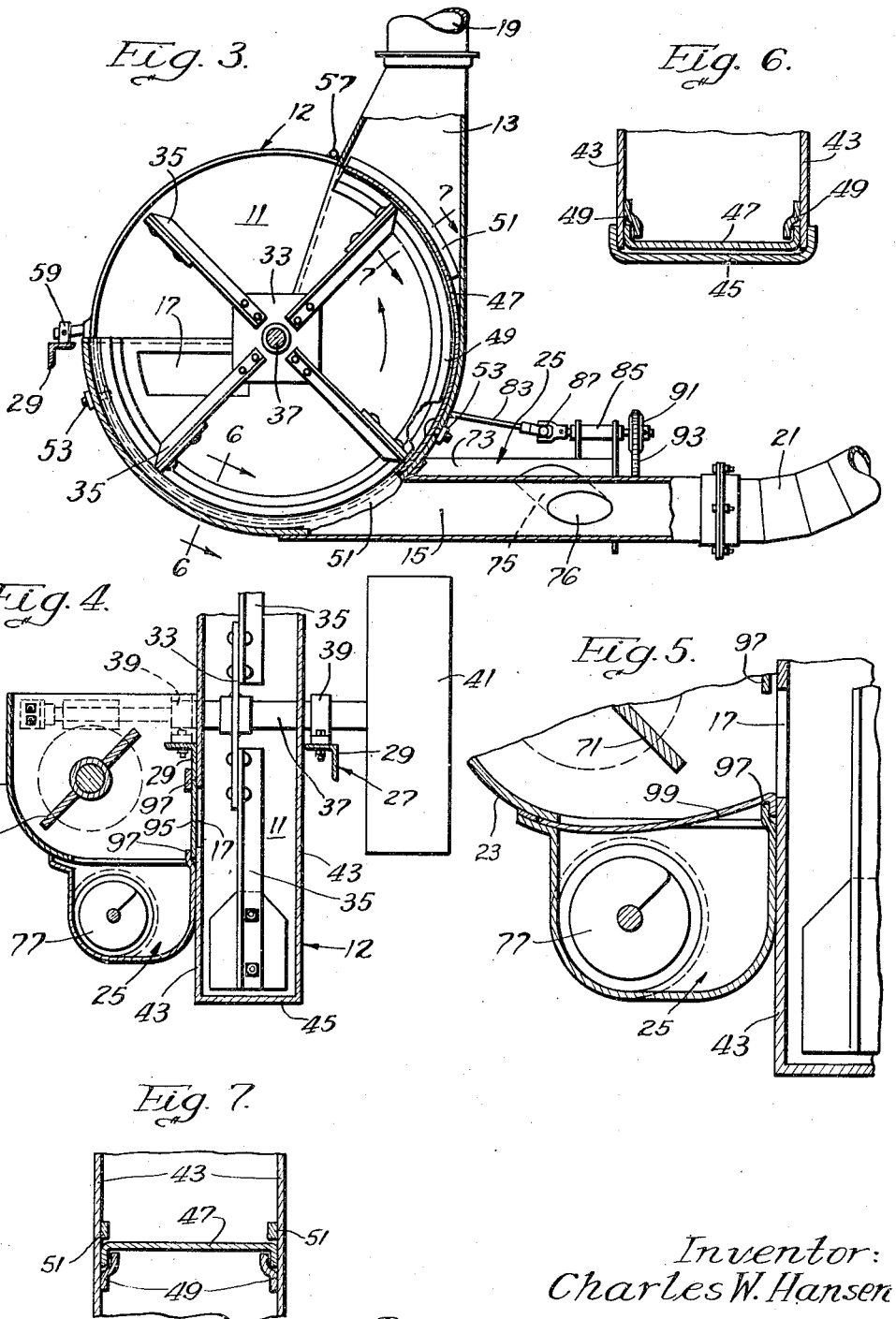

Patented Nov. 22, 1949

2,488,626

UNITED STATES PATENT OFFICE 2,488,626

SILO FILLER AND GRAIN BLOWER

Charles W. Hansen, Racine, Wis., assignor to J. I. Case Company, Racine, Wis., a corporation of Wisconsin Application July 2, 1947, Serial No. 758,619

9 Claims. (Cl. 302—37)

The present invention relates to agricultural implements and, in particular, to a combination silo filler and grain blower.

On a farm, ensilage is usually conveyed into a silo or other storage structure by means of a fan type blower. In normal operation, the ensilage is introduced directly into the fan or blower housing so that it is conveyed by the current of air produced, and so that it is also given added impetus by the centrifugal action of the fan blades acting upon the material. Such a conveyor is not adapted for conveying grain because the impact between the grain and the fan blades splits the kernels of grain and causes the grain to rot and mold during storage.

As a result, on most farms two separate pieces of apparatus are needed for silo filling and grain conveying. This is inconvenient and uneconomical and, accordingly, it is the object of the present invention to provide a blower operated mechanism which can be used for conveying ensilage and which can be used to blow grain into a grain bin or elevator without passing the grain through the fan housing. Other objects and advantages of the invention will be apparent from reference to the following description and the accompanying drawings.

In the drawings:

Fig. 3 is a sectional view taken on line 3—3 of Fig. 2;

Fig. 4 is a sectional view taken on line 4—4 in Fig. 2;

Fig. 5 is a view similar to Fig. 4 showing the arrangement of the ensilage inlet when the apparatus is used as a silo filler;

Fig. 6 is a sectional view taken on line 6—6 of Fig. 3; and

Fig. 7 is a sectional view taken on line 7—7 in Fig. 3.

Figure 1:
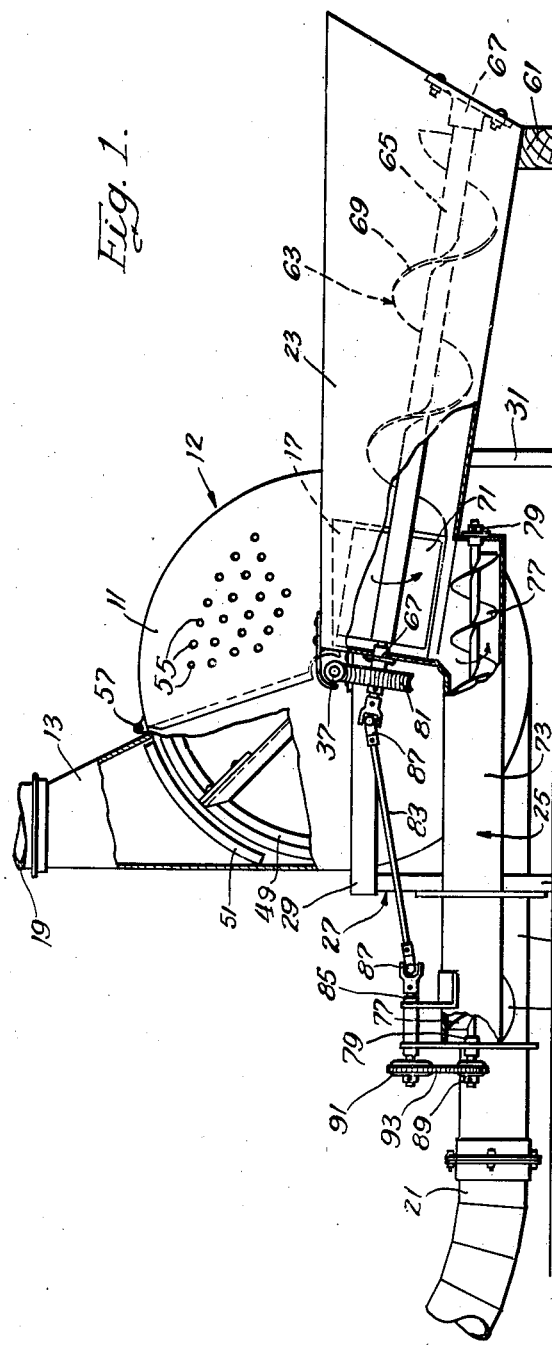
Fig. 1 is a side elevational view of a combination silo filler and grain blower, in accordance with the invention.
Figure 2:
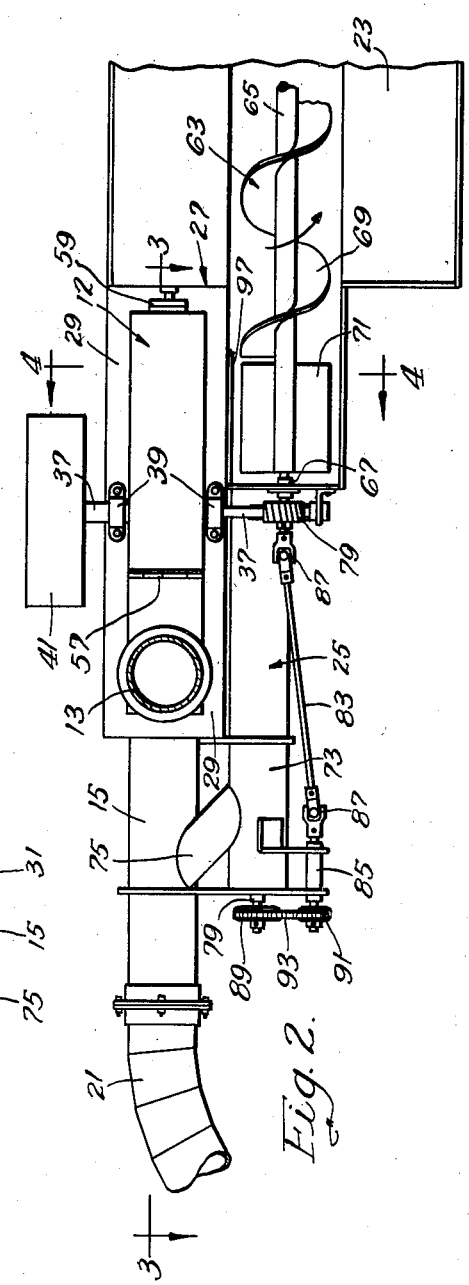
Fig. 2 is a plan view of the apparatus illustrated in Fig. 1.

Apparatus in accordance with the invention comprises a fan type blower 11 and a housing 12 which is provided with a pair of outlet pipes 13 and 15, and an inlet opening 17. One of the outlet pipes, 13, which extends in a generally vertical direction, is adapted to be connected to a silo or other ensilage storage structure by means of a conventional pipe 19, and the other outlet pipe 15 is adapted to be connected to a grain bin or the like by a similar horizontal pipe 21. Means are provided for selectively closing these outlet pipes 13 and 15 so that air from the fan is delivered to but one of the outlet pipes at one time. A hopper 23 is provided for receiving the material to be conveyed, and this hopper is adapted to admit the material into either the blower 11 directly or to admit the material into a conveyor 25 which bypasses the material around the blower housing 12 and which introduces it into the outlet pipe 15 which is spaced ahead of the blower and which is adapted to be connected to the grain storage bin.

The apparatus is supported upon a frame 27 which comprises a generally rectangular, horizontally disposed section 29 which is supported upon a plurality of supporting columns 31. The various elements of the frame may be fabricated from suitable structural sections as illustrated. The blower mechanism 11 used in the apparatus includes a rotatable plate member 33 having the general shape illustrated in Fig. 3 and provided with four equally spaced vanes 35. The fan assembly is mounted for rotatable movement within the housing 12, as previously noted, by means of a suitable shaft 37 which is supported in pedestal type bearings 39 on the frame 27 of the apparatus. A drive pulley 41 is keyed to one end of the shaft 37 so that it may be connected to a suitable source of power, such as the power take-off pulley on a tractor.

The blower housing 12 is cylindrical in form, and is so designed that a part of the upper half thereof may be opened to permit convenient access to the fan wheel for adjustment or repair. The housing 12 is supported on the frame 27, and the lower half of the housing 12 is defined by vertical side portions 43 which serve to reinforce the frame 27. An arcuate wrapping member 45 (Fig. 6) extends around the side portions 43 and serves as the outer surface of the cylinder.

An arcuate sealing member 47, formed as illustrated in Fig. 6, is supported within the cylindrical housing 12 by means of clips or curved rails 49 which are attached to the side portions 43 of the housing. The rails 49 hold the sealing member 47 in slidable contact with the wrapping member 45 around its periphery. Curved track members 51 are attached to the side members 43 of the housing 12 adjacent the outlet pipes 13 and 15 to provide a bearing surface for the sealing member 47 (Fig. 7). The arcuate sealing member 47 is of a length sufficient to seal off either the vertically or the horizontally extending outlet pipe without interfering with delivery of air through the other outlet pipe. The arcuate sealing member 47 is adapted to slide on the rails 49 so that air may be selectively delivered to one outlet pipe or the other. Movement of the sealing member 47 from one extreme position to the other, as determined by suitable stops, not shown, effects simultaneous opening of one outlet and closing of the other. A suitable bolt locking arrangement 53 is provided to lock the arcuate sealing member 47, in either of its extreme positions, to the outer portion of the housing 12, as illustrated in Fig. 3.

The hinged cover section of the housing 12 is provided with a plurality of vent holes 55, in order to provide a sufficient supply of air to the fan. The hinged cover portion is desirably connected to the housing 12 by means of a hinge 57, as illustrated, and is provided with a locking means which may consist of the latch 59 also illustrated. Hinging the cover at its top constitutes a valuable safety feature and is fully described and claimed in the application of Verbeten et al. Serial No. 709,516, filed Nov. 13, 1946.

The large hopper 23 is of fabricated metal construction and is attached to one of the flat sides of the housing 12. The hopper 23 extends outwardly to a support member 61 which is adapted to rest on the ground. The hopper 23 is flared outwardly so as to provide the maximum area for materials which are to be dumped therein. The inlet 17 which opens into the blower housing 12 is located adjacent the inner end of the hopper 23.

For facilitating movement of the material to be conveyed along the hopper 23, a longitudinally extending feed auger 63 is provided. The auger 63 is of fabricated construction and comprises a shaft 65 which is rotatably journaled into suitable bearings 67 in the hopper, 23, and to which there is attached a spirally formed member 69. At the inner end of the auger 63, adjacent the inlet 17 into the housing 12, the spirally formed member 65 merges into a paddle section 71 which is adapted to throw the ensilage into the blower housing 12.

The conveyor 25 includes a closed conduit or tubular member 73 which is supported on the frame and which extends generally horizontally from the hopper 23, adjacent the inlet 17 to the housing 12, to a point adjacent the horizontally extending outlet pipe 15 of the blower housing 12. An angularly disposed, tubular member 75 connects the horizontally disposed tubular member 73 with an inlet opening 76 provided in the horizontal outlet pipe 15 so that material may be conducted from the hopper 23 into the second outlet pipe 15. The inlet opening 76 is desirably spaced some distance from the blower housing 12 so that eddy currents in the air stream are minimized. A grain auger 77 is journaled for rotatable movement within the tubular member 73 by suitable bearings 79, so as to effect positive movement of material through the tube.

The two augers 63 and 77 are driven from a worm 79 on the main drive shaft 37 by means of a worm wheel 81 which engages the worm 79. The worm wheel 81 is keyed to the supporting shaft 65 for the hopper feed auger 63 so that the hopper feed auger 63 is powered at all times during the operation of the apparatus. The shaft of the grain auger 77 is connected to the worm wheel 81 by means of an outwardly extending drive shaft 83 which is journaled in a suitable bearing 85 on the conveyor tube 73 and which is provided with a pair of universal joints 87. A sprocket 89 on the grain auger shaft is connected to a sprocket 91 on the outwardly extending drive shaft 83 by means of a drive chain 93. The augers 63 and 77, and the fan vanes 35 are driven at predetermined, correlated speeds to effect the efficient movement of the material to a storage point.

A sliding gate valve 95 co-operates with a pair of rigid clips 97 which are attached to the housing 12 adjacent its inlet opening 17, to close off the blower housing 12 from the hopper 23. A similar plate member 99 is provided to seal the opening between the feed hopper 23 and the conveyor 25 (Fig. 5). During operation of the apparatus as a silo filler, the plate member 99 is inserted between the feed hopper 23 and the conveyor 25 so as to prevent entry of the ensilage into the grain conveyor tube 73. The inlet 17 to the blower housing 12 is opened and the arcuate sealing member 47 is positioned so that the vertically extending delivery outlet pipe 13 from the housing 12 is open and the horizontally extending outlet pipe 15 is closed. The vertically extending outlet pipe 13 is connected to the silo by means of the usual pipe 19, and the drive pulley 41 is connected to a suitable source of power.

Ensilage is dumped into the hopper 23, from which it is conveyed by means of the auger 63 to the inlet 17 of the blower housing 12. The paddle members 71 throw the material into the housing 12 where it is acted directly upon by the force of the fan vanes 35 as well as the blast of air which is produced by the vanes. The co-action of these two forces conveys the ensilage up into the silo.

When it is desired to use this same apparatus for conveying grain, the arcuate segment 47 is shifted to open the horizontally extending outlet pipe 15 and to close simultaneously the vertically extending outlet pipe 13; the inlet 17 to the blower housing 12 is sealed by means of the plate member 97; and the plate 99 sealing off the grain from the grain conveyor 25 is removed. The grain is dumped into the hopper 23 and is conveyed, by the auger 63, into the tubular member 73 which is provided with the grain auger 77. The auger 77 carries the grain outwardly until it falls through the inlet opening 76, in the horizontal delivery outlet pipe 15, into the air stream produced by the fan vanes 35. The force of the air alone will carry the grain several hundred feet to the desired storage point.

The various novel structural combinations of the invention thus co-operate to produce an implement of great versatility and usefulness. By the use of a single blower and feeding means either heavy material such as silage or light, fragile material such as grain can be efficiently and economically conveyed. With the present apparatus, it is no longer necessary for a farmer to have two separate conveying mechanisms, but with this one machine he may convey either grain or ensilage at will.

The features of my invention that are believed to be new are expressly set forth in the appended claims.

I claim:

1. In apparatus of the class described a blower having an inlet opening and a pair of separate outlet passageways, one of said outlet passageways being provided with a second inlet opening, means for selectively closing either of said inlet openings, means selectively closing either of said outlet passageways, means for feeding material selectively into either of said inlet openings, and means for operating said blower to effect movement of the material so fed.

2. In apparatus of the class described a blower having an inlet opening and a pair of tangentially disposed outlets, one of said outlets being vertically extending and the other of said outlets being horizontally extending, a second inlet opening in said horizontally extending outlet, means for selectively closing either of said inlet openings, means for selectively closing either of said outlets, means for feeding material selectively into either of said inlet openings, and means for operating said blower.

3. In apparatus of the class described a blower having an inlet opening and a pair of tangentially disposed outlets, one of said outlets being vertically extending and the other of said outlets being horizontally extending, a second inlet opening, spaced downstream of said blower, in said horizontally extending outlet, means for selectively closing either of said outlets, means for selectively closing either of said inlet openings, auger means for feeding material selectively into either of said inlet openings, and means for operating said blower and said auger means.

4. In apparatus of the class described a blower comprising a housing having an inlet opening and a pair of tangentially disposed outlet pipes, means for selectively closing either of said outlet pipes, and a vane type fan wheel supported for rotation within said housing, a second inlet opening in one of said outlet pipes, means for selectively closing said inlet openings, means for feeding material selectively into either of said inlet openings including a hopper having a feed auger disposed in the bottom thereof, and means for operating said fan wheel and said auger at predetermined, correlated speeds.

5. In apparatus of the class described a blower comprising a generally cylindrical housing having an inlet opening and a pair of tangentially disposed outlet pipes, one of said outlet pipes being generally vertically extending and the other of said outlet pipes being generally horizontally extending, means for selectively closing either of said outlet pipes, and a vane type fan wheel supported for rotation within said housing, a second inlet opening in said horizontally extending outlet pipe, said second inlet opening being spaced from said blower housing, means for selectively closing either of said inlet openings, means for feeding material to either of said inlet openings, and means for rotating said fan wheel.

6. In apparatus of the class described a blower comprising a generally cylindrical housing having an inlet opening and a pair of tangentially disposed outlet pipes, one of said outlet pipes being generally vertically extending and the other of said outlet pipes being generally horizontally extending, means for selectively closing either of said outlet pipes, and a vane type fan wheel supported for rotation within said housing, a second inlet opening in said horizontally extending outlet pipe, said second inlet opening being spaced from said blower housing, means for selectively closing either of said inlet openings, means for feeding material to either of said inlet openings including a hopper which is open at the top and which is provided with an auger and means for rotating said fan wheel and said auger at predetermined, correlated speeds.

7. In apparatus of the class described a blower comprising a generally cylindrical housing having an inlet opening and a pair of tangentially disposed outlet pipes, a single means for simultaneously opening one of said outlet pipes and closing the other, and a vane type fan wheel supported for rotation within said housing, a second inlet opening in one of said outlet pipes, said second inlet opening being spaced from said blower, means for selectively closing either of said inlet openings, means for feeding material to either of said inlet openings, and means for rotating said fan wheel.

8. In apparatus of the class described a blower comprising a generally cylindrical housing having an inlet opening and a pair of tangentially disposed outlet pipes, one of said outlet pipes being generally vertically extending and the other of said outlet pipes being generally horizontally extending, means for selectively closing either of said outlet pipes comprising an arcuate segment supported for slidable movement about the peripheral surface of said housing, said segment being of a length sufficient to close either of said outlets, and means for locking said segment to said housing, and a vane type fan wheel supported for rotation within said housing, a second inlet opening in said horizontally extending outlet pipe, said second inlet opening being spaced along said outlet pipe some distance from said blower housing, means for selectively closing either of said inlet openings, means for feeding material to either of said inlet openings, and means for rotating said fan wheel.

9. In apparatus of the class described a blower comprising a generally cylindrical housing having an inlet opening and a pair of tangentially disposed outlet pipes, one of said outlet pipes being generally vertically extending and the other of said outlet pipes being generally horizontally extending, means for selectively closing either of said outlet pipes comprising an arcuate segment supported for slidable movement about the peripheral surface of said housing, said segment being of a length sufficient to close either of said outlets, and means for locking said segment to said housing, and a vane type fan wheel supported for rotation within said housing, a second inlet opening in said horizontally extending outlet pipe, said second inlet opening being spaced along said outlet pipe some distance from said blower housing, means for selectively closing either of said inlet openings, means for feeding material to either of said inlet openings including a hopper extending outwardly from said inlet opening in said housing, said hopper being provided with an auger for moving the material in said hopper towards said inlet opening, a closed conduit connecting said hopper and said second inlet opening and a second auger within said conduit for moving material into said second inlet opening, and means for rotating said fan wheel and said augers at predetermined, correlated speeds.

CHARLES W. HANSEN.

No references cited.